United States Patent
Jiang-Häfner (10) Patent No.: US 9,312,786 B2
(45) Date of Patent: Apr. 12, 2016

(54) CELLS CONTROL IN A MULTILEVEL CONVERTER

(71) Applicant: ABB Technology Ltd, Zürich (CH)

(72) Inventor: Ying Jiang-Häfner, Ludvika (SE)

(73) Assignee: ABB Technology Ltd, Zürich (CH)

( * ) Notice: Subject to any disclaimer, the term of this patent is extended or adjusted under 35 U.S.C. 154(b) by 0 days.

(21) Appl. No.: 14/646,456

(22) PCT Filed: Dec. 21, 2012

(86) PCT No.: PCT/EP2012/076599
§ 371 (c)(1),
(2) Date: May 21, 2015

(87) PCT Pub. No.: WO2014/094868
PCT Pub. Date: Jun. 26, 2014

(65) Prior Publication Data
US 2015/0340967 A1    Nov. 26, 2015

(51) Int. Cl.
*H02M 1/14* (2006.01)
*H02M 7/217* (2006.01)
(Continued)

(52) U.S. Cl.
CPC ............... *H02M 7/483* (2013.01); *H02M 1/12* (2013.01); *H02M 1/14* (2013.01); *H02M 7/217* (2013.01);
(Continued)

(58) Field of Classification Search
CPC .............................. H02M 7/217; H02M 1/12
See application file for complete search history.

(56) References Cited

U.S. PATENT DOCUMENTS 3,902,112 A * 8/1975 Cordier ................. H02P 25/022
                                                     318/718
3,913,005 A * 10/1975 Cook ...................... H01F 38/04
                                                     323/346
(Continued)

FOREIGN PATENT DOCUMENTS

EP    1 852 913 A1    11/2007
GB    2 221 793 A      2/1990
(Continued)

OTHER PUBLICATIONS

Agelidis et al., ""Dead-Band" PWM Switching Patterns", IEEE Transactions on Power Electronics, Jul. 1, 1996, vol. 11, No. 4, pp. 522-531, figure 7, Section IV.
(Continued)

*Primary Examiner* — Emily P Pham
(74) *Attorney, Agent, or Firm* — Birch, Stewart, Kolasch & Birch, LLP (57) ABSTRACT

Cells in a phase leg of a multilevel converter are controlled through regulating, using tap-changer control, the modulation index of the converter to above 0.80, providing a group of carrier waves for the phase leg, where these carrier waves are identical but displaced in time from each other with a time delay, providing a voltage reference for the phase leg being separate from voltage references provided for other phase legs, stop switching of the cells when waveform values of a power transmission converter waveform are detected to be in a selected interval around a peak value of the power transmission converter waveform and control switching of the cells based on comparisons of the respective carrier waves with the voltage reference when the waveform values of the power transmission converter waveform are detected to be outside the selected interval.

20 Claims, 6 Drawing Sheets

(51) Int. Cl.
  *H02M 7/483* (2007.01)
  *H02M 1/12* (2006.01)
  *H02M 7/5395* (2006.01)
  *H02M 1/00* (2007.01)

(52) U.S. Cl.
  CPC .... *H02M 7/5395* (2013.01); *H02M 2001/0054* (2013.01); *H02M 2007/4835* (2013.01); *Y02B 70/1491* (2013.01)

(56) References Cited

U.S. PATENT DOCUMENTS

| | | | |
|---|---|---|---|
| 4,975,825 A | 12/1990 | Huss et al. | |
| 6,982,890 B2* | 1/2006 | Venkataramanan | H02M 5/293 363/171 |
| 7,989,983 B2* | 8/2011 | Folts | H02J 3/383 307/82 |
| 8,446,743 B2* | 5/2013 | Gupta | H02M 5/297 363/131 |
| 2007/0133242 A1 | 6/2007 | Welchko et al. | |
| 2009/0108441 A1 | 4/2009 | Barr et al. | |
| 2010/0133676 A1 | 6/2010 | Sandin | |
| 2011/0210611 A1* | 9/2011 | Ledenev | H01L 31/02021 307/71 |
| 2011/0316346 A1* | 12/2011 | Porter | G05F 1/67 307/82 |
| 2012/0161526 A1* | 6/2012 | Huang | G05F 1/67 307/77 |
| 2015/0131342 A1* | 5/2015 | Larsson | H02J 3/36 363/35 |

FOREIGN PATENT DOCUMENTS

| | | |
|---|---|---|
| JP | 9-149660 A | 6/1997 |
| JP | 2000-69760 A | 3/2000 |
| JP | 2003-168778 A | 6/2003 |
| WO | WO 96/18234 A1 | 6/1996 |
| WO | WO 2009/086927 A1 | 7/2009 |
| WO | WO 2009/097063 A2 | 8/2009 |

OTHER PUBLICATIONS

Massoud et al., "Control Techniques for Multilevel Voltage Source Inverters", 34th Annual Power Electronics Specialist Conference, IEEE, Jun. 15-19, 2003, vol. 1, pp. 171-176.

Teeuwsen, "Modeling the Trans Bay Cable Project as Voltage-Sourced Converter with Modular Multilevel Converter Design", Power and Energy Society General Meeting, IEEE, Jul. 24, 2011, pp. 1-8, Section IV, abstract, figure 2.

* cited by examiner

CELLS CONTROL IN A MULTILEVEL CONVERTER

FIELD OF INVENTION

The present invention generally relates to multilevel converters. More particularly the present invention relates to a method and computer program product for controlling cells in a phase leg of a multilevel converter, a control device for a multilevel converter and a multilevel converter.

BACKGROUND

Multilevel converters are of interest to use in a number of different power transmission environments. They may for instance be used as voltage source converters in direct current power transmission systems. They are then often used for converting between direct current (DC) and three-phase alternating current (AC). The multilevel converter is then typically based on a number of converter cells, where a cell essentially provides a voltage contribution that is either zero or based on the voltage of an energy storage element of the cell, such as the voltage across a cell capacitor.

The cells are furthermore often placed in phase legs, where there is one phase leg per phase.

One way of controlling the cells of the phase legs is to provide a carrier wave for each cell of each phase leg, where the carrier waves of a phase leg have the same identical shape, typically as a saw-tooth waveform, but displaced in time from each other with a time delay. Each such carrier wave is then compared with a voltage reference which may be shaped as a sine wave. A cell is then switched if the corresponding carrier crosses the voltage reference. This type of control is schematically shown and described in WO 2009/097063.

In such control a situation can occur that the peak value of the carrier wave slightly exceeds the peak value of the voltage reference. If the occurrence of the peak value of the carrier wave occurs in an interval around the peak value of the voltage reference, which interval may be ±30 degrees around the peak value, then the corresponding cell may be switched on almost immediately followed by a switch off or vice versa. This type of switching is normally not necessary, but only leads to unnecessary switching losses. Since the number of cells can be high, the amount of unnecessary switching in a multilevel converter may be significant.

There is therefore a need for limiting the switching.

WO 96/18234 describes one way in which the switching at peak values is limited, which is through so-called dead band pulse width modulation (DBPWM).

In dead band PWM, switching patterns are realized through introducing a common mode voltage, which is basically many zero sequence components with different frequencies, such as 3rd, $5^{th}$, 9th, etc. A common mode implies that all three phases have the same waveform shaper. In DBPWM zero sequences are thus added to a voltage reference that is common for a number of phases. This adding of zero sequences raises the voltage in certain areas, such as around the peak voltages, which may be used to avoid switching around peak levels.

JP 2000-69760 and JP 09-149660 also seem to describe variations of DBPWM.

DBPWM is furthermore described by V. G. Agelidis, P. D. Ziogas, G. Joos in "Dead-band PWM switching patterns", Conf. Rec. IEEE PESC 1992, pp. 427-432.

Also A. M Massoud et al. describe DBPWM in "Control techniques for Multilevel Voltage Source Inverters", 34th Power Electronics Specialist Conference, Jun. 15-19, 2003, Vol. I, pp. 171-176.

However, the introduction of zero sequences in this way will change the shape of the common voltage reference in other areas than the peak area, for instance at areas where the voltage reference has the steepest slopes. This will lead to unnecessary switching, which is not desirable. In the multilevel converter, the frequency of the carrier is normally much lower than the carrier frequency of a 2-level converter. This means that the lower slope of the carrier wave for the multilevel converter may lead to several crosses with the voltage reference in this area.

Application of conventional DBPWM in a cell based converter may lead to a lot of additional switching.

Massoud also mentions another way of modulation, modified sinusoidal PWM, where the carrier is modified. Massoud also mentions that this type of modulation leads to a complex hardware implementation. This hardware implementation will get even more complex if applied to a situation with several time-shifted carriers as described above in relation to WO 2009/097063.

There is therefore still a need for an improvement in the field of control of cells in a voltage source converter, especially in order to reduce the switching losses.

SUMMARY OF THE INVENTION

The present invention is directed towards reducing the amount of switching performed in a multilevel converter.

This object is according to a first aspect of the present invention achieved through a method of controlling cells in a phase leg of a multilevel converter operating to convert between alternating current and direct current, the method being performed by a cell control unit of the converter and comprising regulating, using tap-changer control, the modulation index of the converter to above 0.8, providing a group of carrier waves for the phase leg, where the carrier waves of a phase leg are identical but displaced in time from each other with a time delay, providing a voltage reference for the phase leg being separate from voltage references provided for other phase legs of the converter, stopping switching of the cells when waveform values of a power transmission converter waveform are detected to be in a selected interval around a peak value of the power transmission converter waveform, and controlling switching of the cells based on comparisons of the respective carrier waves with the voltage reference when the waveform values of the power transmission converter waveform are detected to be outside said selected interval.

This object is according to a second aspect of the present invention achieved through a control device for a multilevel converter operating to convert between alternating current and direct current, the converter being connected to a transformer controllable via a tap changer and comprising three phase legs with cells, the control device comprising a central control element configured to regulate, using tap-changer control, the modulation index of the converter to above 0.8, and provide a voltage reference for the phase leg being separate from voltage references provided for other phase legs, a carrier providing block configured to provide a group of carrier waves for a phase leg, where the carrier waves of the phase leg are identical but displaced in time from each other with a time delay, a group of cell control blocks, where each cell control block is configured to compare a corresponding carrier wave with the voltage reference and control a corresponding cell based on the comparison, and a switching control block (34) configured to stop the cell control blocks from switching the cells when waveform values of a power transmission converter waveform are detected to be in a selected interval around a peak value of the power transmission converter waveform, and allow the cell control blocks to control switching of the cells when the waveform values of the power transmission converter waveform are detected to be outside said selected interval.

The object is according to a third aspect of the present invention furthermore achieved through a multilevel converter operating to convert between alternating current and direct current, the converter being connected to a transformer controllable via a tap changer and comprising three phase legs with cells, and a control unit comprising a central control element, a group of cell control blocks and a switching control block according to the second aspect.

The object is according to a fourth aspect of the present invention also achieved through a computer program product for controlling cells in a phase leg of a multilevel converter operating to convert between alternating current and direct current, the computer program product being provided as a data carrier comprising computer program code configured to cause a control device to, when said computer program code is loaded into the control device regulate, using tap-changer control, the modulation index of the converter to above 0.8, provide a group of carrier waves for the phase leg, where the carrier waves of a phase leg are identical but displaced in time from each other with a time delay, provide a voltage reference for the phase leg being separate from voltage references provided for other phase legs of the converter, stop switching of the cells when waveform values of a power transmission converter waveform are detected to be in a selected interval around a peak value of the power transmission converter waveform, and control switching of the cells based on comparisons of the respective carrier waves with the voltage reference when the waveform values of the power transmission converter waveform are detected to be outside said selected interval.

The present invention has a number of advantages. The switching frequency and thereby also the switching losses are reduced. Cell voltage ripple and the circulation currents are not affected. The AC voltage capability of the converter is furthermore increased.

BRIEF DESCRIPTION OF THE DRAWINGS

The present invention will in the following be described with reference being made to the accompanying drawings, where FIG. 1 schematically shows a direct current power transmission system connected between two alternating current power lines, FIG. 2 schematically shows a cell-based voltage source converter connected between two poles.

DETAILED DESCRIPTION OF THE INVENTION

In the following, a detailed description of preferred embodiments of the invention will be given.

Figure 1:
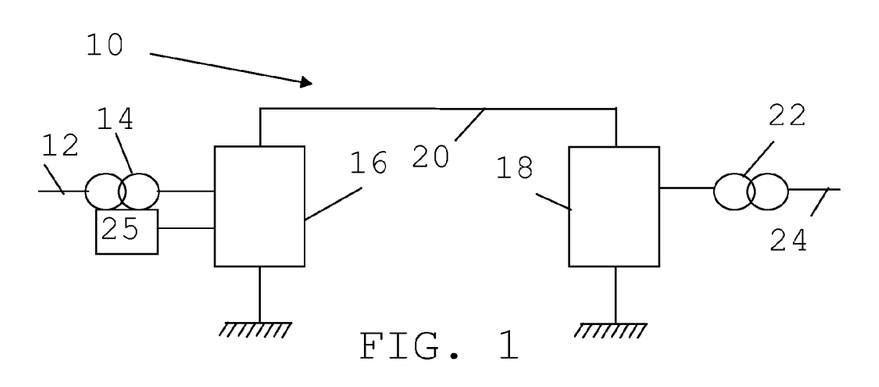

In FIG. 1 there is schematically shown a high-voltage power transmission system 10 in which the principles of the present invention may be applied. The power supply transmission system 10 is in the present invention a direct current power transmission system 10 and then for instance a HVDC (High Voltage Direct Current) power transmission system. It should be realized that the present invention is not limited to such a system, but may be used in other types of DC power transmission systems.

In the figure there is a first Alternating Current (AC) power line 12, which leads to a first transformer 14. The first transformer 14 is connected to a first converter 16, converting between AC and DC. This first converter 16 is in turn connected to a DC power transmission link 20. The DC transmission link 20 may be provided as a cable or overhead line and leads to a second converter 18, which may be an inverter that also converts between AC and DC. The second converter 18 is furthermore connected to a second transformer 22. The second transformer 22 is in turn connected to a second AC power line 24. There is also a tap changer 25 connected between the first transformer 14 and the first converter 16. The tap changer 25 may be connected to any of the two sides of the first transformer 14. It may for instance be connected to the secondary windings of the first transformer 14 or it may be connected to the primary windings of the first transformer 14. A tap changer is an element that can be controlled to change the modulation level of the converter through influencing the turns ratio of the transformer. It should be realized that it is possible that a tap changer is also connected between the second converter and the second transformer.

The system shown in FIG. 1 is a so-called asymmetrical monopole system. It should be realized that the system 10 might just as well be a symmetrical monopole or a bipole system.

Figure 2:
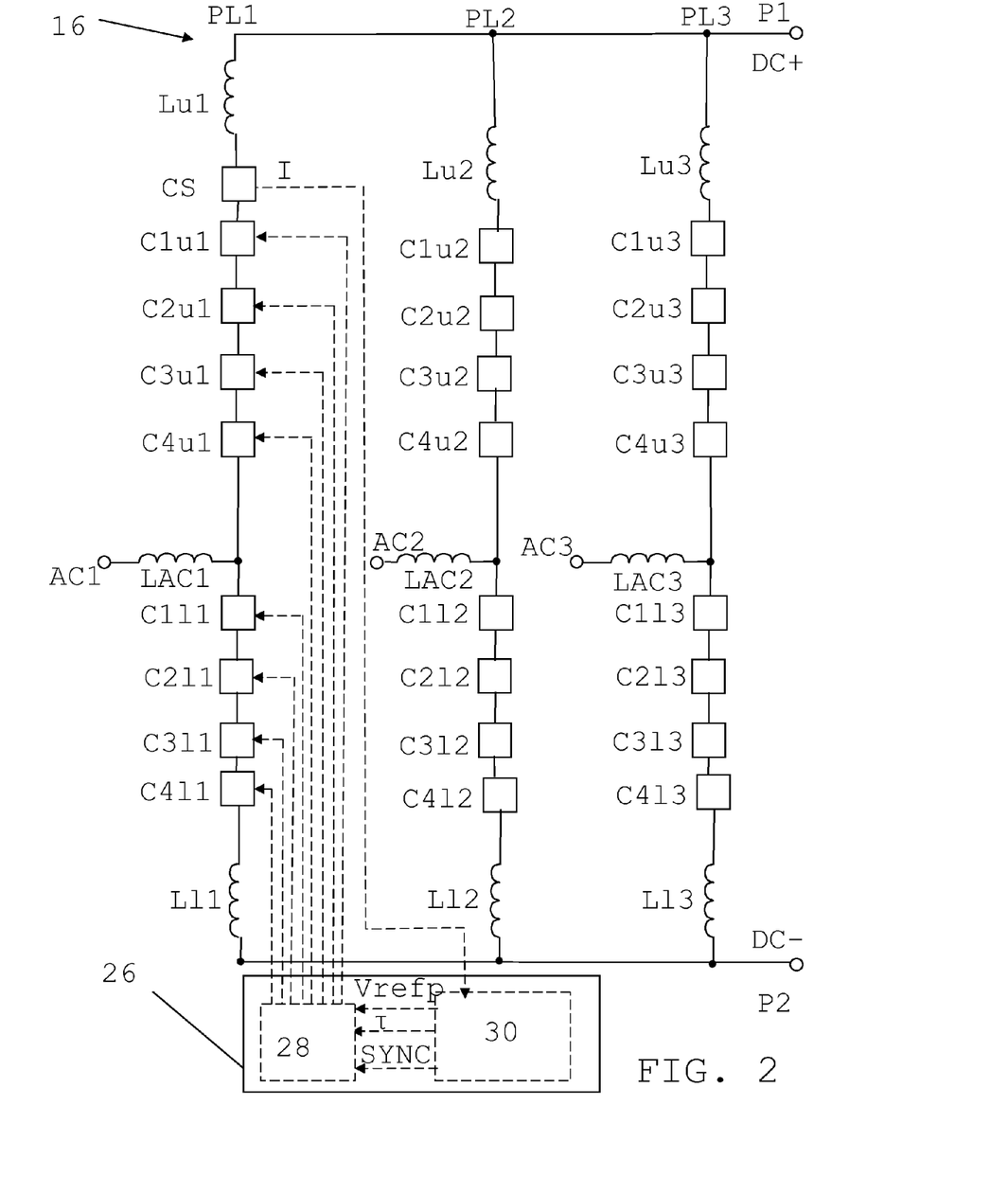

FIG. 2 shows one variation of the first converter 16, which is a multilevel converter in the form of a cell based voltage source converter. The converter 16 comprises a three-phase bridge made up of a number of phase legs. There are in this case three phase legs. There is thus a first phase leg PL1, a second phase leg PL2 and a third phase leg PL3. The phase legs are more particularly connected between two DC poles P1 and P2 and the mid points of the phase legs are connected to corresponding alternating current terminals AC1, AC2, AC3. The midpoint of a phase leg is here connected to a corresponding AC terminal via a reactor LAC1, LAC2 and LAC3. A phase leg is thereby divided into two halves, an upper half and a lower half, where such a half is also termed a phase arm.

Each phase leg PL1, PL2, PL3 has a first and second end point. In a converter of the type depicted in FIG. 1 the first end points of all the phase legs PL1, PL2, PL3 are connected to a first DC terminal DC+ while the second end points are connected to a second DC terminal DC−, where the first DC terminal DC+ forms the first pole P1 and the second DC terminal forms the second pole P2. In the example if FIG. 1, the first pole may be provided using the DC power line, while the second pole is connected to ground.

The phase legs of the voltage source converter 16 in the first example in FIG. 1 comprise cells. A cell is a unit that may be switched for providing a voltage contribution to the voltage on the corresponding AC terminal. A cell then comprises one or more energy storage elements, for instance in the form of capacitors, and the cell may be switched to provide a voltage contribution corresponding to the voltage of the energy storage element or a zero voltage contribution. If more than one energy storage element is included in a cell it is possible with even further voltage contributions. A cell that has been set for providing a voltage contribution is in the following also termed an inserted cell, The cells are with advantage connected in series or in cascade in a phase leg.

As mentioned above, the voltage source converter of FIG. 2 is only one example of a multilevel converter where the invention may be used. FIG. 2 is an example of a three-phase converter with phase legs providing three parallel phase outputs. It is as an alternative possible to provide a three-phase converter in the form of three single-phase converters connected in series between the two poles, where these single-phase converters are made up of cells.

In the example given in FIG. 2 there are eight series-connected or cascaded cells in each phase leg, four on each side of the AC terminal, where the phase leg half between the AC terminal and the positive DC pole P1 is also named an upper phase arm and the phase leg half between the AC terminal and the negative DC pole P2 is named a lower phase arm. Thus the upper phase arm of the first phase leg PL1 includes four cells $C1u1$, $C2u1$, $C3u1$ and $C4u1$, while the lower phase arm of the first phase leg PL1 includes four cells $C1/1$, $C2/1$, $C3/1$ and $C4/1$. In a similar fashion the upper phase arm of the second phase leg PL2 includes four cells $C1u2$, $C2u2$, $C3u2$ and $C4u2$, while the lower phase arm of the second phase leg PL2 includes four cells $C1/2$, $C2/2$, $C3/2$ and $C4/2$. Finally the upper phase arm of the third phase leg PL3 includes four cells $C1u3$, $C2u3$, $C3u3$ and $C4u3$, while the lower phase arm of the third phase leg PL3 includes four cells $C1/3$, $C2/3$, $C3/3$ and $C4/3$. The number of cells provided in FIG. 2 is only exemplifying. It therefore has to be stressed that the number of cells in a phase arm may vary. It is often favorable to have many more cells in each phase arm, especially in HVDC applications. A phase arm may for instance comprise hundreds of cells. There may however also be fewer.

Control of each cell in a phase leg is normally performed through providing the cell with a control signal directed towards controlling the contribution of that cell to meeting a voltage reference. The sum of the contributions obtained in this way may then be used for forming a waveform on the AC terminal of a phase leg, for instance a sine wave. In order to control the cells there is therefore a control unit 26 comprising a number of cell control elements 28 and a central control element 30.

The control unit 26 is provided for controlling all the phase legs of the converter. However, in order to simplify the description of the invention only the control of the first phase leg PL will be described. The element of the control unit 26 that is provided for controlling this first phase leg PL1 is the cell control element 28. It should be realized that similar cell control elements are provided for the other phase legs of the voltage source converter 16. The cell control element 28 receives a voltage reference Vref and a delay τ associated with a carrier wave from the central control element 30. The central control element is with advantage a high level control element that provides an ordinary voltage reference in a known way based on the current to be supplied to the DC pole, the AC and DC voltages and the power to be supplied through the converter. The voltage reference in the figure is furthermore a processed voltage reference Vrefp. How such a processed voltage reference is obtained based on the ordinary voltage reference mentioned above, will be described in more detail later. The central control element 30 provides a separate voltage reference to each phase leg, which may be done without adding a common mode voltage component, i.e. which may be done without adding zero-sequences at various harmonics of the fundamental frequency of the reference voltage. It is possible that the zero sequences that are omitted are only those that may be used in dead band PWM. It is thus possible that one or a few zero sequences, such as the third harmonic zero sequence is used, which however cannot lead to a dead band PWM. It is as an example possible that there is only one zero sequence, the third harmonic zero sequence.

The central control element 30 may also control the tap changer. The first phase leg PL1 is in FIG. 2 shown as comprising a current sensor CS or phase arm current detector. The sensor CS provides a current sensor signal I corresponding to a phase arm current to the central control element 30. It is furthermore possible that also the other phase legs comprise a current sensor in the same way. More details on how a voltage reference may be created can be found in EP 1174993.

The voltage reference provided to the cell control element 28 for the first phase leg PL1 may furthermore be shifted in phase by 120 degrees from voltage references provided to cell control elements for the second and third phase legs PL2 and PL3, where all are shifted in phase by 120 degrees from one another. The central control element 30, which is a system control element, thus provides a separate voltage reference for each phase leg. Based on the inputs that it receives, the cell control element 28 of the first phase leg PL1 then provides control signals that are applied to the cells $C1u1$, $C2u1$, $C3u1$, $C4u1$, $C1/1$, $C2/1$, $C3/1$ and $C4/1$ for selectively switching them to assist in forming a desired waveform on the first AC terminal AC1.

Figure 3:
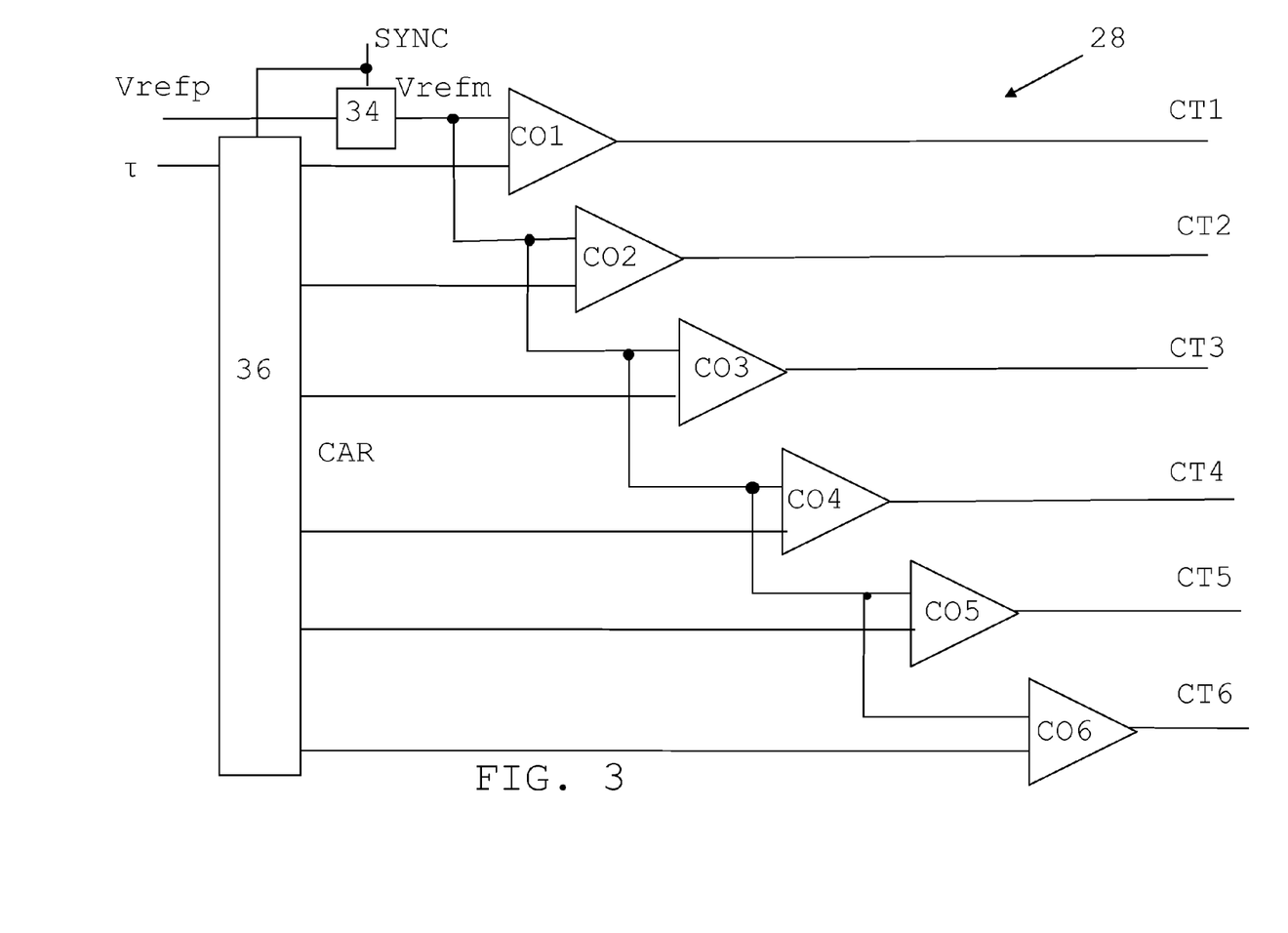
FIG. 3 shows a hardware realization of a cell control element of the voltage source converter, FIG. 4 schematically shows a reference adjusting block of a central control element of the voltage source converter, FIG. 5 schematically shows the structure of a first type of voltage source converter cell, FIG. 6 schematically shows the structure of a second type of voltage source converter cell, FIG. 7 schematically shows the structure of a third type of voltage source converter cell, FIG. 8 schematically shows a voltage reference together with a number of carrier waves for controlling cells of a phase leg, FIG. 9 schematically shows a flow chart of a method of controlling cells in a phase leg according to an embodiment of the invention, and FIG. 10 schematically shows a computer program product comprising computer program code for implementing a method of the invention.

FIG. 3 shows an exemplifying hardware realization of the cell control element 28 provided for six series-connected cells of the first phase leg. This realization implements a cell control scheme for a phase leg.

It should be realized that the number of cells are only selected for illustrative purposes and that the structure can be extended for more or fewer cells.

The cell control element 28 comprises a switching control block 34 that receives the processed voltage reference Vrefp from the central control element The switching control block 34 also receives the synchronization signal SYNC.

Based on the synchronization signal SYNC, the switching control block 34 gets knowledge about when peak values of the voltage reference occurs and may perform various activities based on this knowledge. These activities will be described later.

In the example given in FIG. 3, an output of the switching control block 34 is in turn connected to a first cell control block CO1, to a second cell control block CO2, to a third cell control block CO3, to a fourth cell control block CO4, to a fifth cell control block CO5 and to a sixth cell control block CO6.

There is furthermore a carrier providing block 36 that also receives the carrier delay τ, the voltage reference Vrefp and the synchronization signal SYNC indicating the phase of the voltage reference.

The carrier providing block 36 generates a group of carriers CAR, comprising one carrier for each cell, based on the frequency and voltage on the corresponding AC terminal, here the first AC terminal, as well as based on the synchronization signal SYNC. The carriers are identical but displaced in time from each other with the time delay τ. The carriers CAR are then sent from the carrier providing block 36 to the cell control blocks.

The first cell control block CO1 receives a non-delayed carrier wave from the carrier providing block 36. A first delayed carrier wave is provided to the second cell control block CO2, a second delayed carrier wave is provided to the third cell control block CO3, a third delayed carrier wave is provided to the fourth cell control block CO4, a fourth delayed carrier wave is provided to the fifth cell control block CO5 and a fifth delayed carrier is provided to the sixth cell control block CO6.

The carrier providing block may employ a tapped delay line for obtaining the group of carriers CAR. The cell control blocks CO1, CO2, CO3, CO4, CO5 and CO6 may be provided as comparators where the processed voltage reference is compared with the carrier wave. This means that they provide a logical signal having one logical level when the level of the voltage reference Vref is above the level of the corresponding carrier and an opposite logical level when the carrier level is above the voltage reference level. Thereby the first cell control block CO1 provides a first cell control signal CT1 for controlling a first cell of the first phase leg, the second cell control block CO2 provides a second cell control signal CT2 for controlling a second cell of the first phase leg, the third cell control block CO3 provides a third cell control signal CT3 for controlling a third cell of the first phase leg, the fourth cell control block CO4 provides a fourth cell control signal CT4 for controlling a fourth cell of the first phase leg, the fifth cell control block CO5 provides a fifth cell control signal CT5 for controlling a fifth cell of the first phase leg and the sixth cell control block CO6 provides a sixth cell control signal CT6 for controlling a sixth cell of the first phase leg, where these controlled cells are connected in cascade or series with each other.

Figure 4:
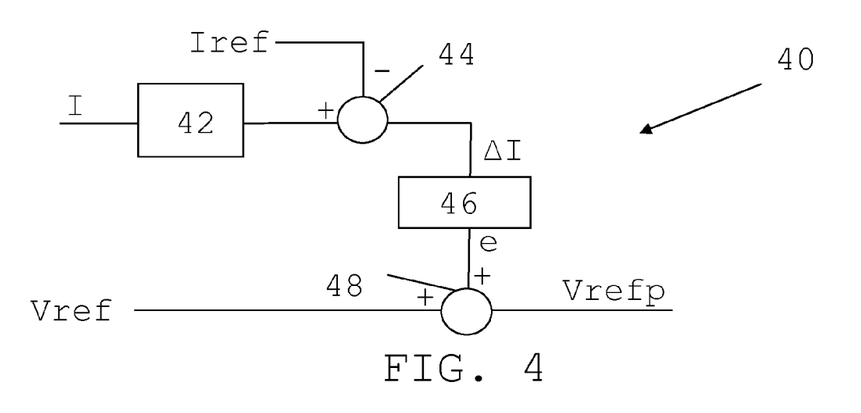

FIG. 4 shows a block schematic of one version of an optional reference adjusting block 40. This optional reference adjusting block is typically provided in the central control element. The optional reference adjusting block 40 receives the ordinary or unprocessed voltage reference Vref as well as the current measurement I and processes the voltage reference Vref based on this current measurement I for providing a processed voltage reference Vrefp. The reference adjusting block 40 comprises a filter 42 that receives the current measurement I. The filter 42 is for instance a bandpass filter and is provided for filtering out one or more harmonics of the phase arm current I. The filter 42 is connected to an optional subtracting block 44 that receives the filtered phase arm current as well as a harmonics current reference value Iref. This reference value is typically a value of zero. The subtracting block 44 forms a difference signal ΔI between the filtered phase arm current and the reference value, which difference signal ΔI is supplied to a PI regulator 46. The PI regulator performs proportional (P) and integrating (I) regulation of the difference signal ΔI in order to form an error signal e. The error signal e is then provided to an adder 48, which also receives the voltage reference Vref. The adder 48 then forms the modified voltage reference Vrefp as the sum of the voltage reference Vref and the error signal e.

There are a number of different cell types that can be used, where three will be described in the following.

Figure 5:
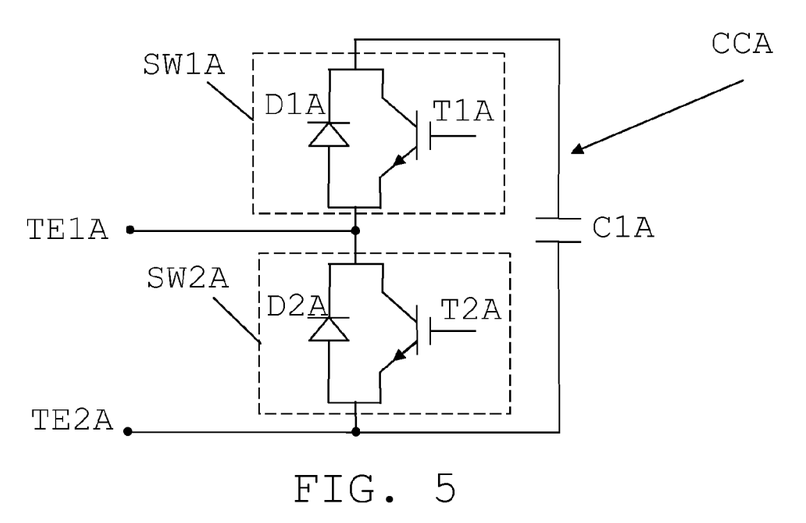

FIG. 5 schematically shows a first type of converter cell CCA. The cell CCA is a half-bridge converter cell and includes an energy storage element, here in the form of a capacitor C1A, which is connected in parallel with a first group of switches. The switches in the first group are connected in series with each other. The first group here includes two switches SW1A and SW2A (shown as dashed boxes), where each switch SW1A, SW2A may be realized in the form of a switching element that may be an IGBT (Insulated Gate Bipolar Transistor) transistor together with an anti-parallel diode. In FIG. 5 there is therefore a first switch SW1A having a first transistor T1A with a first diode D1A oriented upwards in the figure, which is towards the capacitor C1A, and connected in parallel between emitter and collector of the transistor T1A. The direction of conductivity of the diode is thereby from the emitter to the collector. There is also a second switch SW2A connected in series with the first switch SW1A and having a second diode D2A with the same orientation as the first diode D1A and connected in parallel between emitter and collector of a second transistor T2A.

This first type of cell CCA comprises a first connection terminal TE1A and a second connection terminal TE2A, each providing a connection for the cell to a phase leg of the voltage source converter. In this first type of cell the first connection terminal TE1A more particularly provides a connection from the phase leg to the junction between the first and the second switch SW1A and SW2A, while the second connection terminal TE2A provides a connection from the phase leg to the junction between the second switch SW2A and the capacitor C1A. These connection terminals TE1A and TE1B thus provide points where the cell can be connected to the phase leg. The connection of the first connection terminal TE1A thus joins the phase leg with the connection point or junction between two of the series connected switches of the first group, here the first and second switches SW1A and SW2A, while the connection of the second connection terminal TE2A joins the phase leg with a connection point between the first group of series connected switches and the energy storage element, which is here the connection point between the second switch SW2A and the first capacitor C1A.

Figure 6:
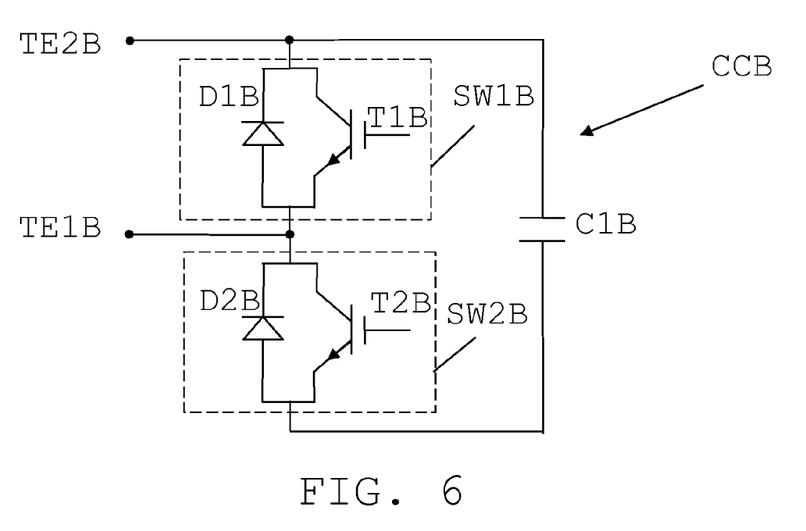

FIG. 6 schematically shows a second type of cell CCB, which is also a half-bridge converter cell. This second type of cell has the same type of components as the first type of cell and is interconnected in the same way. There is thus here a first group of switches including a first switch SW1B (shown as a dashed box) having a first transistor T1B and a first anti-parallel diode D1B in series with a second switch SW2B (also shown as a dashed box) having a second transistor T2B with a second anti-parallel diode D2B. In parallel with this first group of switches there is a first energy storage element, also here in the form of a capacitor C1B, where the first switch SW1B of this cell CCB according to this second type has the same position and orientation as the first switch of the first type and the second switch SW2B of this second type has the same position and orientation as the second switch of the first type. There is also here a first connection terminal TE1B providing a connection between the phase leg and the connection point between the first and the second switches SW1B and SW2B. However as opposed to the cell of the first variation the second connection terminal TE2B here provides a connection between the phase leg and the junction between the first switch SW1B and the capacitor C1B.

Figure 7:
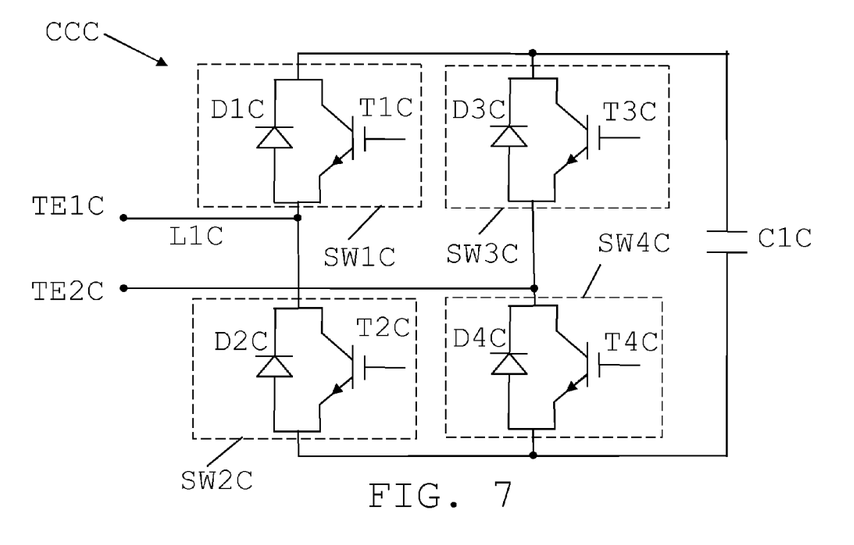

FIG. 7 schematically shows a third type of converter cell CCC including the same type of components having the same orientation, i.e. first and a second switches SW1C and SW2C each including a first and a second transistor T1C and T2C with anti-parallel first and second diodes D1C and D2C in a first group or branch provided in parallel with an energy storage element, also here realized as a capacitor C1C. These switches SW1C and SW2C in the first group are provided in the same way as in the previously described cells. However here there is a second group of switches connected in series with each other. This second group of switches is connected in parallel with the first group as well as with the energy storage element. The second group here includes a third and a fourth switch SW3C and SW4C, provided through a third transistor T3C with anti-parallel third diode D3C and through a fourth transistor T4C with anti-parallel fourth diode D4C having the same orientation as the first and second diodes. This second group is thus provided in a further branch in parallel with the capacitor C1C. As before, a first connection terminal TE1C here provides a connection between the phase leg and the junction between the first and the second switches SW1C and SW2C. However the second connection terminal TE2C here also differs. In this third type of cell it provides a connection between the phase leg and a connection point between two of the series connected switches in the second group, and here this connection is provided via the junction between the third and fourth switches SW3C and SW4C.

As opposed to the cells of the first and second variations, this cell CCC is a full-bridge cell.

These three types of cells are merely a few of the possible cell variations. It is for instance possible with cells providing more voltage levels, for example using more than one energy storage element. A cell may as one example comprise two energy storage elements where a single of these may be connected for providing a voltage contribution. Alternatively the elements may be connected in parallel or in series with each other in order to enable the creation of various further cell voltage contributions.

As was mentioned earlier, when operating a voltage source converter, the cells are switched for meeting a voltage reference. A cell control block thus compares the voltage reference with a carrier wave and switches the corresponding cell based on the comparison.

Figure 8:
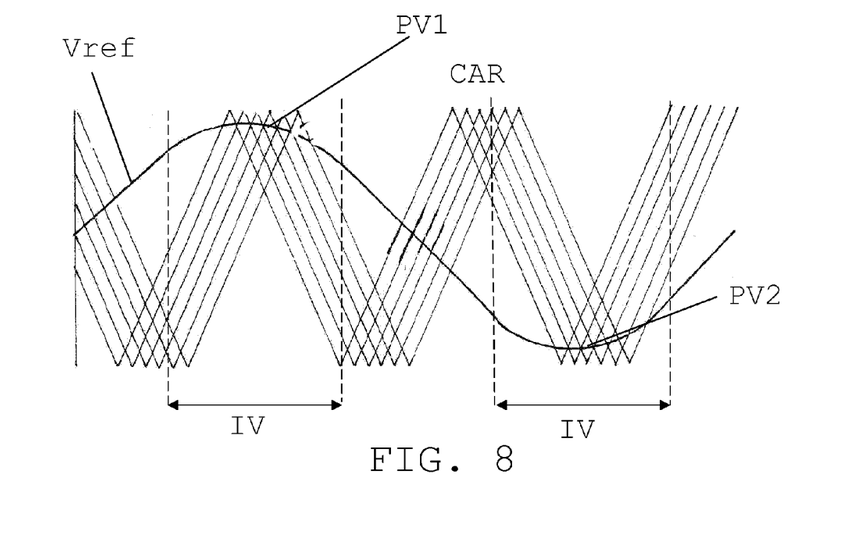

FIG. 8 schematically shows one period of the original non-adjusted voltage reference Vref, a time interval IV around a first positive peak value PV1 of the voltage reference Vref, a time interval IV around a second negative peak value PV2 of the voltage reference Vref as well as the different time-shifted versions of the carrier wave CAR provided for the cell control blocks in FIG. 3.

The power rating of multilevel converters is steadily increasing, for instance due to the desire to transmit power at higher and higher DC voltage levels in HVDC.

However, then the losses of the converter become more and more significant in the total cost of the transmission system.

The losses of the converter can be divided into conducting losses and switching losses. The conducting losses may only be affected by the semiconductor design. However, the switching losses are possible to influence through the control of the converter.

The switching losses depend on the switching frequency and the phase arm current at the instant of switching actions.

When looking at the curves in FIG. 8, which are obtained at operation of the converter at a high modulation index, it can be seen that the voltage reference Vref is a sine wave and the carriers CAR are saw-tooth waves, where the frequency of the carrier may as an example be about three times the frequency of the voltage reference Vref. The time shift τ between the carrier waves may be $2\pi/pM$, where p is the pulse number and M depending on the number of cells in the phase leg, such as 8. The pulse number may be defined as the time period of the voltage reference Vref divided by the period of the Carrier wave CAR.

It can furthermore be seen that if the voltage reference Vref is compared with the carriers CAR, each carrier will cross the voltage reference Vref two times in an area around the positive peak value PV1 of the non-modified voltage reference Vref and two times in an area around the negative peak value PV1 of the non-modified voltage reference Vref. As the cells are controlled to be switched at every such crossing, this means that switching of a cell will be performed twice in a short time interval. This switching around the peak levels has limited impact on the creation of the desired voltage, especially when the modulation index is high. However, the switching does lead to switching losses that will lower the efficiency of the converter. As several cells may be switched in this way, the losses may furthermore be considerable.

The present invention is provided for addressing this problem.

Figure 9:
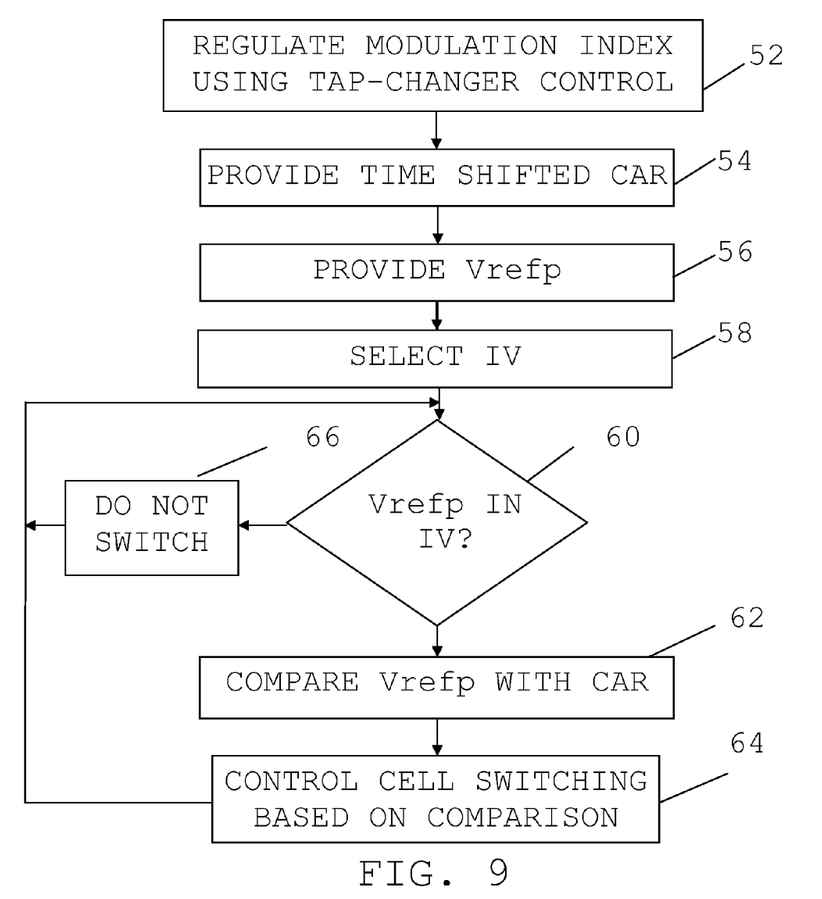

The functioning of an embodiment will now be described also with reference being made to FIG. 9, which shows a flow chart of a number of steps in method according to an embodiment of the invention. The description will furthermore be made in relation to one phase, here the first phase. It should however be realized that the other phases may be operated in a similar manner.

The first converter 16 operates with a modulation index that may be as high as possible, for instance above 0.80. It may as an example be in the range of 0.80-0.86. This modulation index may be obtained through the central control element 30 of the control unit 26 regulating the modulation index through tap changer control of the tap changer 25, step 52.

The central control element 30 provides the delay τ and synchronization signal SYNC to the cell control element 28. The cell control element 28 provided for the first phase thereby obtains or receives the delay τ and synchronization signal SYNC from the central control element 30. These signals are more particularly received by the carrier providing block 36, which provides a group of carrier waves CAR, step 54, where the carrier waves are identical but time shifted, i.e. displaced in time from each other with the time delay τ.

The time shifted carrier waves are provided to the cell control blocks CO1, CO2, CO3, CO4, CO5 and CO6.

The central control element 30 provides the voltage reference Vref for the phase leg to the cell control element, step 56. The cell control element 28 provided for the first phase leg thereby obtains or receives the voltage reference Vref from the central control element 30, where the voltage reference Vref is provided as a wave with positive and negative peak values PV1, PV2 and separate from voltage references provided for other phase legs of the converter. The voltage reference is thus exclusively provided for the cell control element 28 controlling the cells of the first phase leg PL1. It may furthermore lack a common mode voltage causing the traditional dead-band modulation.

The voltage reference, which in this example is a processed voltage reference Vrefp for the phase leg generated by the reference adjusting block, is provided to the switching control block 34. In case the reference adjusting block is omitted an unprocessed or ordinary voltage reference Vref would be instead be sent to the switching control block 34 from the central control element 30.

The switching control block 34 then selects an interval around a peak value of a power transmission converter waveform, step 58. The power transmission converter waveform is a waveform having positive and negative peak values PV1 and PV2 in the fundamental component. The power transmission converter waveform is in this first embodiment the voltage reference Vref. The selecting may be done with the aid of the synchronization signal SYNC. As the synchronization signal SYNC provides the phase of the voltage reference Vref, it is then possible to determine the start and the end of such a predetermined interval IV based on the signal.

Thereafter the switching control block investigates if waveform values are in the interval IV surrounding a peak value, i.e. if values of the voltage reference, are in the time interval IV surrounding a peak value PV1 or PV2.

In case the voltage reference Vrefp is not in the interval, step 60, i.e. if waveform values are outside of the interval IV, then the switching control block 34 provides the reference Vrefp to each of the cell control blocks CO1, CO2, CO3, CO4, CO5 and CO6, i.e. to the group of cell control blocks. The cell control blocks are thus allowed to operate normally. The voltage reference delivered by the switching control block 34 is in this case the same signal as it receives, which may thus be a processed voltage reference Vrefp or an unprocessed voltage reference Vref. The signal is thus unchanged. The cell control blocks CO1, CO2, CO3, CO4, CO5 and CO6 then compare the voltage reference Vrefp with the time-shifted versions of the carriers CAR, step 62. Each cell control block thus compares a corresponding carrier wave with the voltage reference Vref. Thereafter the cell switching is controlled based on the comparisons, step 64. The switching control block 34 thus allows the cell control blocks CO1, CO2, CO3, CO4, CO5, CO6 to control switching of the cells when the waveform values of the power transmission converter waveform are detected to be outside said selected interval IV.

Each cell control block CO1, CO2, CO3, CO4, CO5 and CO6 therefore provides a cell control signal CT1, CT2, CT3, CT4, CT5 and CT6 based on the comparison it has made. The cell control signals may be signals that vary between two logical states, where one state turns on a switch and the other turns off a switch. After this has been done a new investigation is made if the voltage reference is in an interval around a peak value or not.

It is here possible that two signals are provided for a cell from a cell control block. If for instance the cell is half-bridge cell of the first or the second type then one of these signals, switches on one of the switches when the corresponding carrier wave CAR rises above the voltage reference Vrefp and switches off the same switch when carrier CAR falls below the voltage reference Vrefp, while the other signal switches off the other switch when the carrier wave CAR rises above the voltage reference Vrefp and switches on the same switch when it falls below.

However, in case the waveform values of the voltage reference are in the interval, step 60, then the switching control block 34 makes sure that no switching is performed, step 66. The switching control block thus stops cell switching through stopping the cell control blocks CO1, CO2, CO3, CO4, CO5, CO6 from switching the cells when the waveform values of the power transmission converter waveform are detected to be in the selected interval IV around the peak value PV1 of the voltage reference Vref.

This may be done through changing the shape of the voltage reference in the interval IV. The changing in shape may here consist of changing the shape around the two peak values PV1 and PV2 of the voltage reference through raising the absolute value of the voltage reference in the interval IV. The raising may be the raising of the absolute value of the voltage reference Vref in the interval IV above the maximum level of the carrier waves CAR. The changing may thus involve raising the voltage level in the two intervals IV of the period that surround the positive and negative peak values PV1 and PV2 in order to obtain a modified voltage reference. This raising may more particularly be a raising with 1.01 or 1.1.

When a raised voltage reference is used, this is then provided to each of the cell control blocks CO1, CO2, CO3, CO4, CO5 and CO6, where it is compared.

The above mentioned raising of the absolute value of the voltage reference is made to a level so that each interval IV of changed shape lacks intersections between the voltage reference and the carrier wave. The absolute value of the voltage reference in the raised interval may thereby stay above the absolute value of the carrier wave. This thus means that through the raising of the voltage reference, the carrier wave will stay below the voltage reference in the interval surrounding the peak values PV1 and PV2 and thereby the unnecessary switching in the intervals IV is avoided. Since the voltage reference level is above the levels of the carriers, no switching will occur in the intervals IV.

The raising of the voltage is merely one way of avoiding switching. Countless others exist, where one other way is to lock the outputs from the cell control blocks during the time intervals IV so that they cannot change state.

Through ensuring that switching is not performed in the interval IV, the switching losses are lowered while still ensuring that a good output waveform is obtained. As there is no common voltage components which cause the traditional dead-band PWM, and thereby no change of the voltage reference between the two intervals, i.e. the voltage reference is continuous in the area of the voltage reference having the steepest slopes, there is no excessive switching in the area where switching is important.

Through ensuring that switching is not performed, for example through providing a voltage reference that has been modified in such a way that it is partly a continuous wave and partly amplified, for example with 1.01, on phase basis the switching is thus reduced. Furthermore, as seen phase to phase, the voltage reference will behave as a perfect sinus wave. Within a cycle, 120 degrees may be used as a dead band on a phase level, and consequently the valves related to this phase are not switched during these 120 degrees (separated into two 60 degree intervals around the peak values). The converter phase-to-phase quantities are however always controllable using the other phases.

An interval IV may furthermore be an interval in the range of ±15-±30 degrees around a corresponding peak value PV1 or PV2 and with advantage ±30 degrees.

Throughout the previously described exemplifying operation, the cell control element 28 also obtains or receives the current measurements I of the first phase leg PL1 from the current measurement unit CS.

When switching is avoided around the peaks of the voltage reference, harmonic currents, especially of the fifth and seventh order may occur. It may be desirable to reduce these. This is handled by the reference adjusting block 40.

For this reason, the voltage reference Vref and the phase arm current measurements I are received by the reference adjusting block 40. In the filter 42 of the reference adjusting block harmonics of the phase arm current are filtered out. As an example the fifth harmonic current may be filtered out. It is possible that for instance the seventh harmonic current is filtered out instead of or in addition to the fifth harmonic current. If both are to be filtered out, then there may be provided a parallel reference adjusting block. The harmonic current that has been filtered out is then used by the optional subtracting block 44 for forming the difference ΔI. This error signal e is then provided to the PI regulator 46, which multiplies and integrates the difference signal in two parallel branches for forming the error signal e. This error signal e is then added to the voltage reference Vref by the adder 48 in order to form a processed voltage reference Vrefp. The reference adjusting block 40 thus filters out harmonic components of the phase arm current and adjusts the voltage reference based on the filtered harmonic components. The processed or adjusted voltage reference Vrefp may thereafter be provided to the switching control block 34.

The above mentioned switching may generate some zero sequence harmonics. If the AC terminals of the converter are connected to the delta connected secondary windings of the first transformer 14, where these secondary windings form a valve side of the first transformer 14, this valve side will be floating. This floating transformer valve side may be used for eliminating zero sequence harmonics.

The invention thus has a number of advantages. The switching frequency and thereby also the switching losses are reduced. The switching may be optimized so that it will not occur at peak current levels. The cell voltage ripple and the circulation current are not affected. The AC voltage capability is increased.

The cell control unit may be a part of the converter or it may be provided as a separate entity. In case it is provided as a separate entity it may be a control device for the converter.

Figure 10:
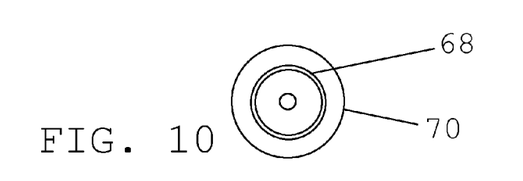

The cell control element of the control unit was above described as being provided as a number of hardware components, and furthermore as a number of discrete components. Also the central control element may be provided in this way. The control unit, both the cell control elements and the central control element may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. FIG. 10 shows one such CD Rom disc 70 with computer program code 68.

There are a number of possible variations that may be made apart from those already mentioned. Instead of receiving the synchronization signal, the switching control block may for instance comprise a peak value detector in order to determine the peak value of the voltage reference. In the case of a raised voltage reference, it is also possible for the central control element to provide a voltage reference to the cell control element already having a changed shape in the intervals. Furthermore the operation mentioned above was made in relation to the voltage. It is possible to, in the same way, act on the phase arm current instead of on the voltage. The power transmission converter waveform may thus be the current running through a phase arm of the phase leg.

From the foregoing discussion it is evident that the present invention can be varied in a multitude of ways. It shall consequently be realized that the present invention is only to be limited by the following claims.

The invention claimed is:

1. A method of controlling cells in a phase leg of a multi-level converter operating to convert between alternating current and direct current,
   the method being performed by a cell control unit of the converter and comprising
   regulating, using tap-changer control, a modulation index of the converter to above 0.80,
   providing a group of carrier waves for the phase leg, where the carrier waves of a phase leg are identical but displaced in time from each other with a time delay,
   providing a voltage reference for the phase leg being separate from voltage references provided for other phase legs of the converter,
   stopping switching of the cells when waveform values of a power transmission converter waveform are detected to be in a selected interval around a peak value of the power transmission converter waveform,
   controlling switching of the cells based on comparisons of the respective carrier waves with the voltage reference when the waveform values of the power transmission converter waveform are detected to be outside said selected interval, and
   obtaining measurements of a phase arm current, filtering out harmonic components of the phase arm current and adjusting the voltage reference based on the filtered harmonic components.

2. The method according to claim 1, wherein an interval is in the range of ±15-±30 degrees around the corresponding peak value.

3. The method according to claim 2, wherein the modulation index is in the range 0.80-0.86.

4. The method according to claim 2, wherein the power transmission converter waveform is the voltage reference.

5. The method according to claim 2, wherein the power transmission converter waveform is a phase arm current.

6. The method according to claim 2, wherein the adjusting comprises PI regulating voltage reference through PI regulation of the filtered harmonic components.

7. The method according to claim 1, wherein the modulation index is in the range 0.80-0.86.

8. The method according to claim 7, wherein the power transmission converter waveform is the voltage reference.

9. The method according to claim 7, wherein the power transmission converter waveform is a phase arm current.

10. The method according to claim 1, wherein the power transmission converter waveform is the voltage reference.

11. The method according to claim 1, wherein the power transmission converter waveform is a phase arm current.

12. The method according to claim 1, wherein the adjusting comprises PI regulating voltage reference through PI regulation of the filtered harmonic components.

13. The method according to claim 12, wherein the filtered harmonic components comprise the fifth/and or seventh harmonic components.

14. A control device for a multilevel converter operating to convert between alternating current and direct current, the converter being connected to a transformer controllable via a tap changer and comprising three phase legs with cells, the control device comprising
   a central control element configured to
      regulate, using tap-changer control, a modulation index of the converter to above 0.80, and provide a voltage reference for the phase leg being separate from voltage references provided for other phase legs, a carrier providing block providing a group of carrier waves for a phase leg, where the carrier waves of the phase leg are identical but displaced in time from each other with a time delay, a group of cell control blocks, where each cell control block is configured to compare a corresponding carrier wave with the voltage reference and control a corresponding cell based on the comparison, a switching control block configured to
   stop the cell control blocks from switching the cells when waveform values of a power transmission converter waveform are detected to be in a selected interval around a peak value of the power transmission converter waveform, and
   allow the cell control blocks to control switching of the cells when the waveform values of the power transmission converter waveform are detected to be outside said selected interval, and a reference voltage adjusting block configured to
   obtain measurements of a phase arm current,
   filter out harmonic components of the phase arm current and
   adjust the voltage reference based on the filtered harmonic components.

15. The control device according to claim 14, wherein an interval is in the range of ±15-±30 degrees around the corresponding peak value.

16. The control device according to claim 14, wherein the power transmission converter waveform is the voltage reference.

17. The control device according to claim 14, wherein the power transmission converter waveform is a phase arm current.

18. A multilevel converter operating to convert between alternating current and direct current, the converter being connected to a transformer controllable via a tap changer and comprising:

three phase legs with cells, and a control unit comprising a central control element, a group of cell control blocks a carrier providing block, a switching control block and a reference voltage adjusting block according to claim 14.

19. The multilevel converter according to claim 18, further comprising a phase arm current detector in the first phase leg configured to measure a phase arm current running through a phase arm of the phase leg.

20. A computer program product for controlling cells in a phase leg of a multilevel converter operating to convert between alternating current and direct current, said computer program product being provided as a data carrier comprising computer program code configured to cause a control device to, when said computer program code is loaded into the control device regulate, using tap-changer control, a modulation index of the converter to above 0.80, provide a group of carrier waves for the phase leg, where the carrier waves of a phase leg are identical but displaced in time from each other with a time delay, provide a voltage reference for the phase leg being separate from voltage references provided for other phase legs of the converter, stop switching of the cells when waveform values of a power transmission converter waveform are detected to be in a selected interval around a peak value of the power transmission converter waveform, control switching of the cells based on comparison of the respective carrier waves with the voltage reference when the waveform values of the power transmission converter waveform are detected to be outside said selected interval, and obtain measurements of a phase arm current, filtering out harmonic components of the phase arm current and adjusting the voltage reference based on the filtered harmonic components.

\* \* \* \* \*